US011339732B1

(12) United States Patent
Dixon et al.

(10) Patent No.: US 11,339,732 B1
(45) Date of Patent: May 24, 2022

(54) TURBOCHARGER CONTROL METHOD

(71) Applicant: Ford Global Technologies, LLC, Dearborn, MI (US)

(72) Inventors: Jon Dixon, Great Totham (GB); Andres Arevalo, London (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/171,349

(22) Filed: Feb. 9, 2021

(51) Int. Cl.
*F02D 41/00* (2006.01)
*F02D 21/08* (2006.01)

(52) U.S. Cl.
CPC .......... *F02D 41/0077* (2013.01); *F02D 21/08* (2013.01)

(58) Field of Classification Search
CPC .. F02M 26/61; F02M 26/615; F02D 41/0077; F02D 21/08
See application file for complete search history.

(56) References Cited

U.S. PATENT DOCUMENTS

| | | | |
|---|---|---|---|
| 9,885,303 B2 | 2/2018 | Ishibashi et al. | |
| 2002/0100462 A1* | 8/2002 | Yang | F02D 41/0077 701/108 |
| 2013/0312718 A1* | 11/2013 | Yoshioka | F02M 26/05 123/568.21 |
| 2014/0069396 A1* | 3/2014 | Iemura | F02B 33/40 123/559.1 |
| 2019/0203652 A1 | 7/2019 | Dixon et al. | |
| 2019/0226429 A1* | 7/2019 | Halleron | F02D 41/0077 |
| 2019/0226430 A1* | 7/2019 | Halleron | F02M 26/48 |
| 2019/0338717 A1* | 11/2019 | Nagao | F02M 26/50 |

FOREIGN PATENT DOCUMENTS

| | | |
|---|---|---|
| EP | 2679787 | 1/2014 |
| GB | 2550383 | 11/2017 |

OTHER PUBLICATIONS

Wijetunge et al., "An exhaust pressure control strategy for a diesel engine," Pro Instn Mech Engrs, vol. 218, D.J. Automobile Engineering, pp. 449-464 (2004).

\* cited by examiner

*Primary Examiner* — Sizo B Vilakazi
*Assistant Examiner* — Sherman D Manley
(74) *Attorney, Agent, or Firm* — Haley Guiliano LLP

(57) ABSTRACT

A turbocharger control method and related systems are provided. An operational command to control a level of boost provided by the turbocharger is received. In response to receiving the operational command, an exhaust gas recirculation (EGR) valve is instructed to move from a current position to a desired position. A time taken for the EGR valve to move from the current position to the desired position is determined. A maximum rise rate of exhaust manifold pressure corresponding to a predicted EGR valve position is determined. A permitted exhaust manifold pressure limit for the turbocharger is determined based on a current exhaust manifold pressure, the maximum rise rate of exhaust manifold pressure and the time taken. An operation of the turbocharger is controlled such that the permitted exhaust manifold pressure limit is not exceeded.

20 Claims, 5 Drawing Sheets

Look-Up Table (402)

| EGR Valve Position [%] | 0 | 20 | 40 | 60 | 80 | 100 |
|---|---|---|---|---|---|---|
| Max P3 Rise Rate [k/Pa/s] | 1000 | 700 | 400 | 100 | 100 | 100 |

404 — EGR Valve Position row
406 — Max P3 Rise Rate row

| f (502) | EGR Valve Position Predicted [%] (504) | EGR Valve Position Actual [%] (506) | dP3Max [k/Pa/s] (508) | P3 Actual [kPa] (510) | P3Max [kPa] @ t=t+tDly (512) |
|---|---|---|---|---|---|
| 0 | 60 | 60 | 100 | 250 | 270 |
| 0.1 | 40 | 60 | 400 | 260 | 340 |
| 0.2 | 20 | 60 | 700 | 300 | 440 |
| 0.3 | 20 | 40 | 700 | 370 | 510 |
| 0.4 | 20 | 20 | 700 | 370 | 510 |

TURBOCHARGER CONTROL METHOD

BACKGROUND

The present disclosure relates to an improved turbocharger performance. More particularly, but not exclusively, the present disclosure relates to controlling a turbocharger using an improved exhaust manifold pressure limit function.

SUMMARY

In conventional methods, the position of an exhaust gas recirculation (EGR) valve may be controlled based on the pressure difference across the EGR duct, hence the EGR valve may be controlled to compensate for this effect. However, if a driver requests for a rapid increase in power to be supplied by the engine, the EGR valve may not respond quickly enough to sufficiently compensate for the change in pressure difference across the EGR duct.

If the rate of rise of the exhaust manifold pressure (P3) is too great and such a pressure limit is exceeded, it can cause problems with EGR control. This is because the pressure difference across the valve rises at a faster rate than the valve is able to close and so excess EGR flow may be experienced, resulting in an unwanted drop in available air to the engine. In addition, the ability to control P3 to a target value may be compromised by the delays in response of the EGR valve so the measured P3 could exceed the target value.

It has been recognized that an improved turbocharger control method is desirable to prevent P3 from exceeding the maximum design pressure in an effective manner. In view of the foregoing, the present disclosure provides methods and systems for improving P3 rise rate control.

In accordance with a first aspect of the disclosure, there is provided a method of controlling a turbocharger and/or any other appropriate boost-pressure device. The method comprises receiving an operational command to control a level of boost provided by the turbocharger. The method comprises instructing an exhaust gas recirculation (EGR) valve, e.g., a high pressure EGR valve, to move from a current position to a desired position, in response to receiving the operational command. The method comprises determining a time taken, otherwise described herein as a time delay or a time interval, for the EGR valve to move from the current position to the desired position. The method comprises determining a maximum rise rate of exhaust manifold pressure corresponding to a predicted EGR valve position, e.g., an intermediate position of the EGR valve between the current EGR valve position and the desired EGR valve position. The method comprises determining a permitted exhaust manifold pressure limit for the turbocharger based on a current exhaust manifold pressure, the maximum rise rate of exhaust manifold pressure and the time taken. The method comprises controlling operation of the turbocharger such that the permitted exhaust manifold pressure limit is not exceeded.

In some examples, a desired control parameter value, e.g., a desired EGR valve position, may be determined in order to calculate a permitted exhaust manifold pressure limit for the turbocharger. Controlling operation of the turbocharger in this way reduces the likelihood of decreased turbocharger performance and/or damage on the turbocharger. Consequently, the longevity of the turbocharger can be increased by implementing the method of the first aspect, thereby reducing turbocharger maintenance and repair over the engine's lifespan.

In some examples, the method further comprises a step of enabling the turbocharger control method, e.g., an exhaust manifold pressure limit function, based on any one or more of: determining that an engine speed is greater than a predetermined engine speed, determining that an output torque of an engine is greater than a predetermined output torque, and/or determining a change in combustion mode of an engine.

In some examples, the operational command, e.g., an instruction to adjust a control parameter value, is received upon detecting a request for any one or more of: an increased speed of an engine, an increased amount of torque output by an engine, and/or a change in a combustion mode of an engine. Thus, the present disclosure describes an improved exhaust manifold limit function with greater utility across a range of vehicle operating conditions or commands.

In some examples, the time taken for the EGR valve to move from the current position to the desired position is determined based on a rate of change of position of the EGR valve, the current position and the desired position.

In some examples, the predicted EGR valve position is any one of: the current position, the desired position, or any one or more intermediate valve positions between the current position and the desired position.

In some examples, the time taken for the EGR valve to move from the current position to the desired position comprises a plurality of time intervals. For example, the plurality of time intervals may be linear or non-linear time intervals depending on the rate of change of the EGR valve position.

In some examples, the maximum rise rate of exhaust manifold pressure corresponding to the predicted EGR valve position is determined for each of the plurality of time intervals. By determining the maximum rise rate of exhaust manifold pressure corresponding to each of the predicted EGR valve positions at each time interval, the turbocharger can be controlled by determining what the expected EGR valve position would be for any given time interval if the EGR valve responded substantially instantaneously to the operational command, e.g., using a lookup table.

In some examples, the operation of the turbocharger is controlled until the level of boost provided by the turbocharger reaches a desired level of boost. In this way, the turbocharger control method may be disabled at a point in time when it is determined that the limit function would no longer impact turbocharger performance until another operational command is received. This may improve computational efficiency over having a continuously active limit function.

In some examples, the turbocharger control method is performed continuously during operation of the turbocharger. By using a continuously active exhaust manifold pressure limit function, the turbocharger may be able to react to any sudden operational commands that may occur during its operation and thus reduce any jittering between subsequent operational commands.

According to a second aspect, there is provided a turbocharger control system. The system comprises means for receiving an operational command to control a level of boost provided by the turbocharger. The system comprises means for, in response to receiving the operational command, instructing an exhaust gas recirculation (EGR) valve to move from a current position to a desired position. The system comprises means for determining a time taken for the EGR valve to move from the current position to the desired position. The system comprises means for determining a maximum rise rate of exhaust manifold pressure corresponding to a predicted EGR valve position. The system comprises means for determining a permitted exhaust manifold pressure limit for the turbocharger based on a current exhaust manifold pressure, the maximum rise rate of exhaust manifold pressure and the time taken and means for controlling operation of the turbocharger such that the permitted exhaust manifold pressure limit is not exceeded.

According to a third aspect, there is provided a vehicle comprising the turbocharger control system of the second aspect.

According to a fourth aspect, there is provided a non-transitory computer-readable medium having non-transitory computer-readable instructions encoded thereon for controlling a turbocharger, when executed cause the control circuitry to perform the following steps. A step of receiving an operational command to control a level of boost provided by the turbocharger. A step of, in response to receiving the operational command, instructing an exhaust gas recirculation (EGR) valve to move from a current position to a desired position. A step of determining a time taken for the EGR valve to move from the current position to the desired position. A step of determining a maximum rise rate of exhaust manifold pressure corresponding to a predicted EGR valve position. A step of determining a permitted exhaust manifold pressure limit for the turbocharger based on a current exhaust manifold pressure, the maximum rise rate of exhaust manifold pressure and the time taken. A step of controlling operation of the turbocharger such that the permitted exhaust manifold pressure limit is not exceeded.

It will be appreciated that other features, aspects and variations of the present disclosure will be apparent from the disclosure of the drawings and detailed description. Additionally, it will be further appreciated that additional or alternative examples of methods of and systems for controlling a turbocharger may be implemented within the principles set out by the present disclosure.

FIGURES

The above and other objects and advantages of the disclosure will be apparent upon consideration of the following detailed description, taken in conjunction with the accompanying drawings, in which:

FIG. 4 shows a pre-calibrated table of maximum rise rates of exhaust manifold pressure and corresponding EGR valve positions, in accordance with some examples of the disclosure.

FIG. 5 shows example values of permitted exhaust manifold pressure limits as part of an example implementation, in accordance with some examples of the disclosure.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
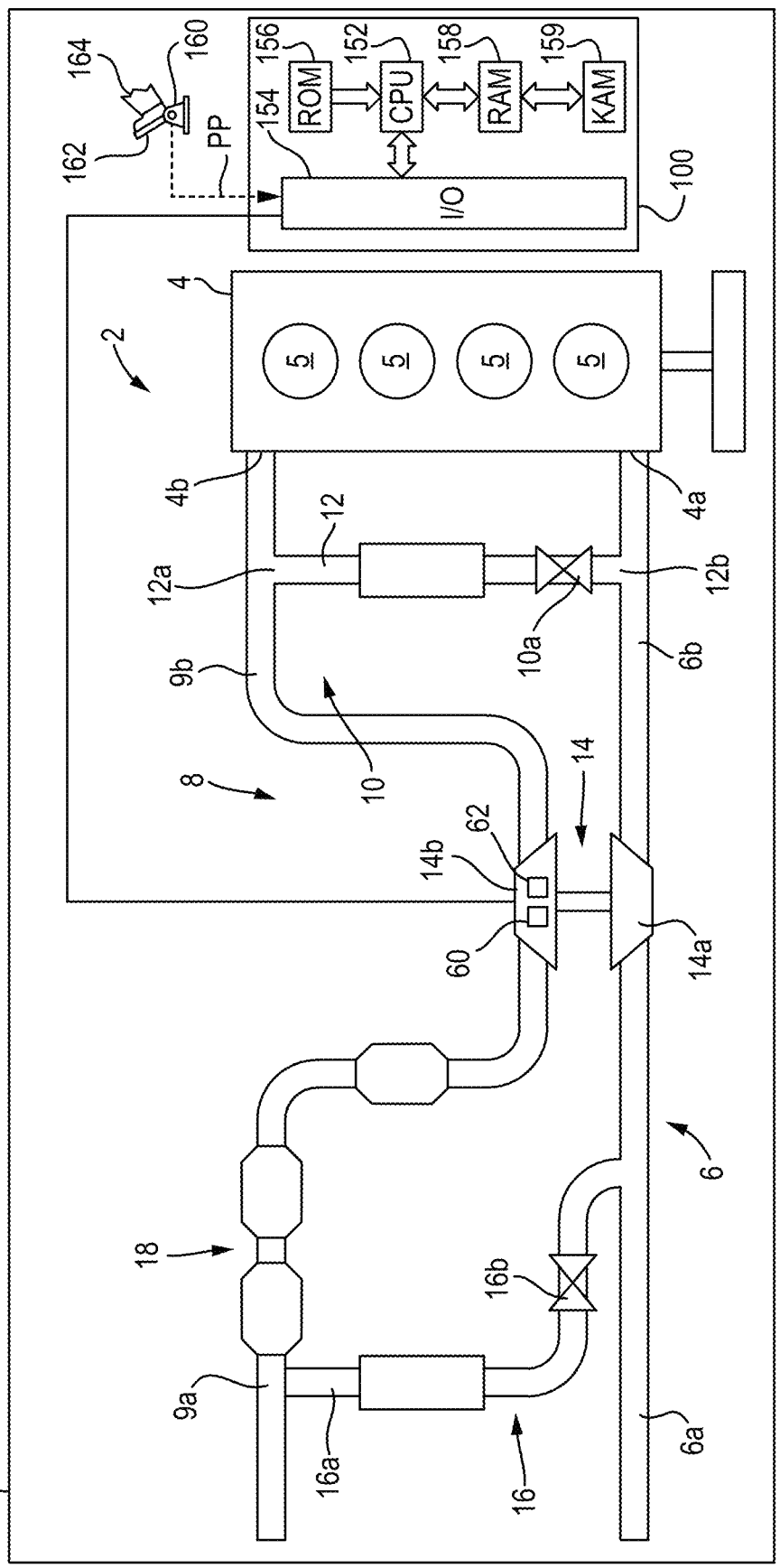
FIG. 1 shows a schematic view of an engine assembly, in accordance with some examples of the disclosure.

With reference to FIG. 1, an engine assembly 2 for a vehicle 50, e.g., a motor vehicle, comprises an engine 4, an intake system 6, an exhaust system 8, a high pressure (HP) exhaust gas recirculation (EGR) system 10 and a turbocharger assembly 14.

As depicted in FIG. 1, the intake system 6 comprises a Low Pressure (LP) intake duct 6a provided upstream of a compressor 14a of the turbocharger assembly. The compressor 14a is configured to increase the pressure of inlet air arriving at the compressor 14a from the low pressure inlet duct 6a to a boost pressure level. Inlet air that has been compressed by the compressor 14a enters a high pressure inlet duct 6b. Inlet gases flow within the HP inlet duct 6b to an inlet manifold 4a of the engine and may be drawn into cylinders 5 of the engine 4.

The inlet gases are mixed with fuel within the cylinders 5 of the engine 4 and the fuel is combusted to provide power to drive the engine 4. Exhaust gases produced through this combustion are exhausted from the engine 4 via an exhaust manifold 4b into a high pressure exhaust duct 9b. Exhaust gases may flow through the HP exhaust duct 9b to a turbine 14b of the turbocharger assembly 14. The exhaust gases may be expanded through the turbine 14b to reach a low pressure exhaust duct 9a. The turbine 14b may be coupled to the compressor 14a via a shaft. Power may be generated by the turbine 14b, by expanding the exhaust gases through the turbine, to power the compressor 14a.

In the arrangement shown in FIG. 1, the turbine 14b is a Variable Geometry Turbine (VGT) comprising variable inlet vanes 60, which are arranged at an angle relative to a rotor 62 of the turbine. By varying the angle of the inlet vanes relative to the rotor, the power generated by the turbine 14b, and hence, the power provided to the compressor 14a may be controlled. The level of boost provided by the turbocharger assembly 14 may therefore be controlled by varying the angle of the variable inlet vanes. The engine assembly 2 may comprise a controller 100 for controlling the operation of the VGT, e.g., by controlling the position of the vanes of the VGT.

Figure 2:
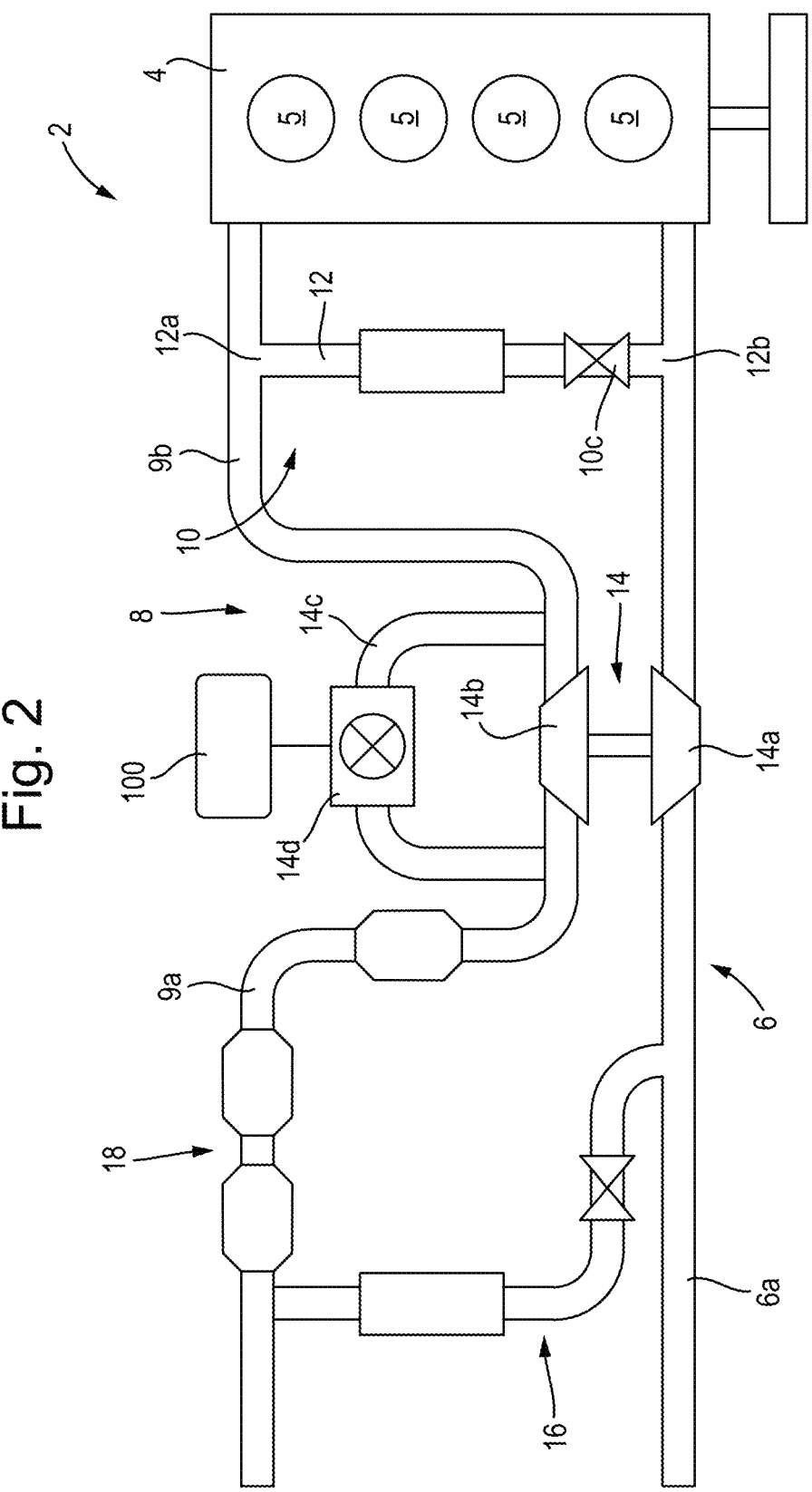
FIG. 2 shows another schematic view of an engine assembly, in accordance with some examples of the disclosure.

In some arrangements, the geometry of the turbine 14b may be fixed and the level of boost provided by the turbocharger assembly 14 may be controlled by an alternative means. For example, as shown in FIG. 2, the turbocharger assembly 14 may comprise a bypass duct 14c configured to allow a portion of the exhaust gases to flow from the HP exhaust duct 9b to the LP exhaust duct 9a without passing through the turbine 14b. The flow of exhaust gases passing through the bypass duct 14c may be controlled by a bypass valve 14d, such as a wastegate. By allowing a portion of the exhaust gases to bypass the turbine 14b, the power generated by the turbine 14b, and hence, the power available to drive the compressor 14a may be reduced. The level of boost provided by the turbocharger assembly 14 may therefore be reduced.

In other arrangements, the exhaust system 8 may comprise the VGT 14b and may also comprise the bypass duct 14c and bypass valve 14d. In this arrangement, the power generated by the turbine 14b may be controlled by varying the geometry of the turbine 14b and/or by varying the position of the bypass valve 14d.

Increasing the pressure of inlet air entering the engine 4, e.g., the level of boost, allows a greater quantity of air to be drawn into the cylinders of the engine, which in turn allows more fuel to be mixed with the air and combusted. Burning more fuel within the engine 4 allows the engine to develop more power and torque to drive the vehicle. When a driver of the vehicle requests more power to be supplied by the engine 4, for example by pressing an accelerator pedal 162 of the vehicle, the turbocharger assembly 14 may be controlled to increase the level of boost provided by the turbocharger assembly, and hence, the power and torque generated by the engine.

The engine assembly 2 may further comprise a Low Pressure (LP) EGR assembly 16 comprising an LPEGR duct 16a configured to recirculate a portion of the low pressure exhaust gases back to the intake system 6, e.g., to the low pressure inlet duct 6a. Flow of exhaust gases within the LPEGR duct 16a may be controlled by an LPEGR valve 16b.

The exhaust system 8 may further comprise one or more exhaust after-treatment devices 18 provided downstream of the turbine 14b. For example, the exhaust system 8 may comprise a lean NOx trap 18, a particulate filter 18 and/or a selective catalytic reduction device 18. The exhaust after-treatment devices may be configured to reduce the concentrations of polluting substances present within the exhaust gases.

One or more of the exhaust after-treatment devices 18 may be controllable, e.g., to adjust the efficiency with which they remove polluting substances from the exhaust gases. Controlling the operation of the exhaust after-treatment devices may affect the mass flow rate of exhaust gases through the exhaust system 8, and hence, through the turbine 14b.

With reference to FIGS. 1 and 2, the HP EGR system 10 comprises an EGR duct 12 configured to recirculate a portion of the exhaust gases leaving the engine 4 back to the intake system 6. The recirculated exhaust gases mix with inlet air within the intake system 6 and may be drawn back into the engine 4. A first end 12a of the HP EGR duct may be coupled to and in fluid communication with the HP exhaust duct 9b, e.g., a position on the exhaust system 8 upstream of the turbine 14b. For example, the first end 12a of the HP EGR duct may be coupled to the exhaust manifold 4b. A second end 12b of the HP EGR duct may be coupled to and in fluid communication with the HP intake duct 6b, e.g., a position on the intake system 6 between the compressor 14a and the engine 4.

In the arrangement shown in FIGS. 1 and 2, the controller 100 may be configured to control the position of the EGR valve 10a. The flow of exhaust gases within the HP EGR duct 12 may be controlled by an HP EGR valve 10a. The flow rate of the exhaust gases may depend on the position of the HP EGR valve 10a and the pressure difference between the first and second ends 12a, 12b of the HP EGR duct 12. For example, in the arrangement shown in FIGS. 1 and 2, when the pressure of exhaust gases within the HP exhaust duct 9b increases relative to the pressure of inlet gases within the HP inlet duct 6b, the flow rate of exhaust gases within the HP EGR duct 12 may increase for a given position of the HP EGR valve 10a.

Increasing the flow rate of EGR gases, either due to a change in the position of the HP EGR valve or a change in the pressure difference across the HP EGR duct 12, may lead to a reduction in the quantity of inlet air present in the intake gases being drawn into the cylinders of the engine 4, thereby reducing the quantity of fuel which may be combusted within the engine. Controlling the power generated by the engine in this way may be beneficial, as it may lead to a reduction in the production of pollutants, such as nitrous oxides, compared to controlling the engine 4 in other ways, for example by using an inlet throttle.

Controller 100 is shown in FIG. 1 as a conventional microcomputer including: microprocessor unit 152, input/output ports 154, read-only memory 156, random access memory 158, keep alive memory 159, and a conventional data bus. Controller 100 is configured to receive various signals from sensors coupled to the engine 4 and send command signals to actuators in components in the vehicle, such as a throttle (not shown). Additionally, the controller 100 is also configured to receive pedal position (PP) from a pedal position sensor 160 coupled to a pedal 162 actuated by an operator 164. Therefore, in one example, the controller 100 may receive a pedal position signal and adjust actuators in the throttle based the pedal position signal to vary engine speed. It will be appreciated that other components receiving command signals from the controller may function in a similar manner. It will also be appreciated that the controller 100 in FIG. 2 may also include the components described above and included in the controller 100, shown in FIG. 1, in some examples. It will also be appreciated that the controller 100 may be configured to implement one or more examples or control strategies described herein.

Similarly, in the arrangement shown in FIG. 2, controlling the turbocharger assembly to increase the level of boost may be achieved by closing the wastegate 14d. Closing the wastegate may reduce the flow area available for exhaust gases to bypass the turbine 14b, which may lead to an increase in the pressure of exhaust gases within the HP exhaust duct 9b and/or the exhaust manifold 4b.

In some arrangements, when a high level of torque is demanded from the engine assembly 2 and the turbocharger assembly 14 is controlled in response to the torque demand to provide an increased level of boost, the pressure of exhaust gases at an inlet of the turbine 14b of the turbocharger assembly, e.g., within the exhaust manifold 4b and/or the high pressure exhaust duct 9b, may approach a maximum design pressure of the turbine 14b. Additionally or alternatively, a ratio of pressure between the inlet and an outlet of the turbine 14b may approach a maximum design ratio.

In some examples, the turbocharger control method may be enabled in various ways.

In conventional methods, a change in driver demand may be used as a trigger to calculate an ever-rising exhaust manifold pressure (P3) limit from the P3 value at the trigger point, with the limit function becoming disabled after a predefined period. The current exhaust manifold pressure can be determined using a pressure sensor or a model. This method has proven useful but does not cover all use cases when the limitation is required. For example, a change in engine combustion mode can also result in a large change in P3 but with constant driver demand. This means that the P3 limit function is not triggered and could result in reduced turbocharger performance.

An exhaust gas recirculation (EGR) system is configured to recirculate exhaust gases from a position upstream of the turbine of the turbocharger, to an inlet of the engine. The maximum permitted rate of increase of the exhaust manifold pressure may be determined at least partially according to the operation of the EGR system, e.g., according to a flow rate of exhaust gases being recirculated by the EGR system. For example, the flow of exhaust gases within the EGR duct may be controlled by an EGR valve.

When there is a request for an increase in the power supplied by the engine, the interaction between the operation of the turbocharger and the EGR system, e.g., a high pressure (HP) EGR system, may lead to an undesirable decrease in the power being provided by the engine due to an increase in the rate of EGR.

In the present disclosure, the turbocharger control method, e.g., the P3 limit function, may be enabled based on look up tables of vehicle speed, engine torque, combustion mode, and/or any other appropriate operational parameter of the turbocharger and/or an engine/vehicle to which it is installed. In some examples, the limit function may be continuously active or only active in particular operating regions of the engine as may be required.

The P3 limit function can be enabled, e.g., based on any one or more of: determining that an engine speed is greater than a predetermined engine speed, determining that an output torque of an engine is greater than a predetermined output torque, and/or determining a combustion mode of an engine. Thus, unlike the conventional methods, there is a range of operational commands upon which the turbocharger can be controlled, as well as or instead of in response to driver demand. For example, the operational command can be one of a plurality of operational commands for activating the P4 limit function.

In some examples, the P3 limit function can be triggered by a change in operational command and disabled after a time-out period. In some examples, after the time-out period, the P3 limit function can be disabled until such time as another operational command is received. It will be appreciated that the P3 limit function of the present invention is capable of reacting to a greater range of operational commands and not just upon driver request.

In example examples, a structure of look up tables with inputs of vehicle speed, engine torque and engine combustion modes can be defined, e.g., which are calibrated with values of 0 to 1. In some examples, an activation function is defined for activating the P3 limit function. For example, the activation function can read the look up tables and compare its output to a threshold value between 0 and 1 to determine whether the engine comprising the turbocharger requires the P3 limit function to be activated.

Furthermore, in some examples, the threshold for activation may be determined based on hysteresis function such that the threshold for activation can be adjusted based on a previous state of the engine or turbocharger. This ensures that there is no jittering around the P3 limit function being enabled.

In some examples, if the activation function outputs a value greater than the determined threshold value, the P3 limit function is activated. Otherwise the P3 limit, e.g., the permitted exhaust manifold pressure limit for the turbocharger, is set at a high value such that it will not interfere with normal operation of the engine.

Figure 3:
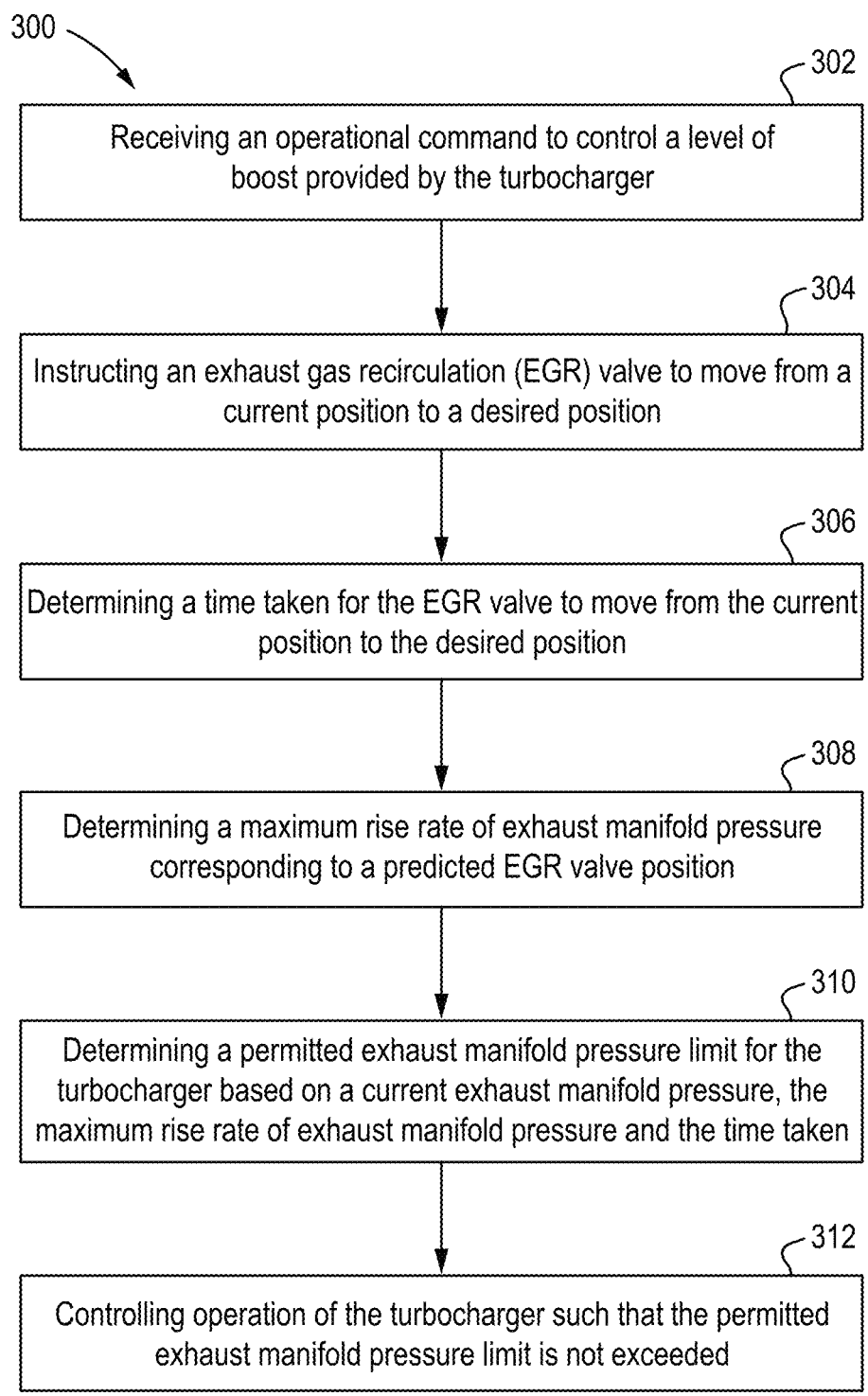
FIG. 3 illustrates an example flowchart of a turbocharger control method, in accordance with some examples of the disclosure.

With reference to FIG. 3, a turbocharger control method 300 will now be described, according to some examples of the present disclosure.

At step 302, an operational command is received to control a level of boost provided by the turbocharger. For example, the operational command may be received upon detecting a request for any one or more of: an increased speed of an engine, an increased amount of torque output by an engine, and/or a change in a combustion mode of an engine. Additionally or alternatively, the operational command may be received upon driver request, e.g., a request for an increased amount of torque to be supplied by the engine.

At step 304, the control parameter is instructed to move from a first position to a second position or, in other words, from a current position to a desired position. By controlling the position of the exhaust gas recirculation (EGR) valve as part of an EGR system, the flow rate of recirculated exhaust gases is controlled by a determined permitted exhaust manifold pressure limit in order to control the operation of the turbocharger.

In some examples, the EGR valve is instructed to move from its current position to a desired position in response to the operational command suitable for activating the exhaust manifold pressure (P3) limit function. For example, the current EGR valve position and the desired EGR valve position may correspond to positions between open and closed positions of the EGR valve at different time instances during a period of rapid increase in boost level.

In some examples, the control parameter of the turbocharger may correspond to the geometry of a variable geometry turbine (VGT) or any other variable creating a lag in reaching the desired level of boost. For example, the control parameter may control a nozzle angle of the VGT.

At step 306, the response delay or the time taken is determined for the EGR valve to move from the current position to the desired position in response to the instructions for adjusting the EGR valve position. The time taken can be determined based on a rate of change of the EGR valve in moving from the current position to the desired position. For example, an EGR valve moving from a current position of 60% to a desired position of 20% at a rate of change of 200%/s equals to 0.2 s, which is herein described as the time taken for the EGR valve to move from the current position to the desired position.

The dynamics of the delay between calculating the desired EGR valve position and the EGR valve attaining that position are approximated by the time taken as determined at step 306. In other words, this is the time after which the EGR valve and turbocharger will be at positions requested at the point of receiving the operational command.

In some examples, the time taken for the EGR valve to move from the current position to the desired position may comprise a plurality of time intervals. Each time interval may correspond to an EGR valve position. Thus, in some examples, the movement of the EGR valve may be a linear or non-linear function, meaning that the plurality of time intervals may also be linear or non-linear.

For the purposes of this disclosure, the turbocharger is assumed to be the fastest responding actuator and the EGR system is assumed to respond more slowly at a time delay determined at step 306 as above. Therefore, it is desired for efficiency and performance that the time delay of the EGR system is compensated for.

In some examples, if there is a delay in the turbocharger actuator, this may also be compensated for. Therefore, in some examples, the time taken may be calculated from the point in time of receiving the operational command and end when the level of boost provided by the turbocharger reaches the commanded or desired boost level. The time taken may alternatively be calculated from the point in time of receiving the operational command up to when the EGR valve reaches the desired valve position.

At step 308, the maximum rise rate of exhaust manifold pressure is determined. The maximum rise rate of exhaust manifold pressure is calculated from a baseline of the exhaust manifold pressure at the trigger point and increases at a rate dependent on a plurality of predicted EGR valve positions. In some examples, the maximum rise rate of exhaust manifold pressure is determined for the predicted EGR valve position at each time interval. Therefore, the predicted EGR valve position can be the current position of the EGR valve, the desired position, or any one or more intermediate EGR valve positions between the current position and the desired position that may be predicted during the time taken for the EGR valve to move from the current to the desired valve position.

In some examples, the maximum rise rate of exhaust manifold pressure can be calculated from a look up function, or a model, of EGR valve positions based on an expected position or predicted position of where the EGR valve will be at a future point in time rather than the current position of the valve at the time of the operational command. For example, the maximum rise rate of exhaust manifold pressure can be calculated from a look up table using the requested EGR valve position, e.g., the predicted EGR valve position, as the input at each time instance, as opposed to the actual position. The look up table may be pre-calibrated with high values when the EGR valve is closed and lower values when the EGR valve is close to fully open in line with the ability of the EGR system to respond to sudden changes in exhaust manifold pressure.

At step 310, a permitted exhaust manifold pressure limit is determined. The permitted exhaust manifold pressure limit at any point during the time delay of the EGR valve can be calculated based on the maximum rise rate of exhaust manifold pressure, a current exhaust manifold pressure that can be determined using a pressure sensor or a model and the time taken for the EGR valve to reach the desired valve position.

For example, at each execution time instance, the maximum rise rate of exhaust manifold pressure can be calculated from the look up table of EGR valve positions, and the resultant change over the time interval (e.g., 10 ms) can be added to the permitted exhaust manifold pressure limit determined for the previous time instance. By using the maximum rise rate of exhaust manifold pressure corresponding to the predicted valve position at any time instance, the turbocharger can be controlled to compensate for the time taken or any time delay caused by response times of the turbocharger or EGR system.

The method may further comprise controlling the operation of the turbocharger using a closed feedback loop if the exhaust manifold pressure exceeds the maximum permitted exhaust manifold pressure limit.

FIG. 4 shows a pre-calibrated table 400 of maximum rise rates of exhaust manifold pressure and corresponding EGR valve positions. More particularly, FIG. 4 shows an example look up table 402 of EGR valve positions 404 against maximum P3 rise rate values 406.

With reference to FIGS. 4 and 5, an example implementation of the method of FIG. 3 will now be described.

FIG. 5 shows a table illustrating, for each time instance 502, the predicted exhaust gas recirculation (EGR) valve positions 504, actual EGR valve positions 506, the maximum rise rate of exhaust manifold pressure (dP3Max) 508, actual exhaust manifold pressure values (P3) 510 and the permitted exhaust manifold pressure limit (P3Max) 512.

At time 0, a maneuver starts with an EGR valve position at 60% open and a P3 value of 250 kPa. Following an operational command, e.g., driver demand or a change in combustion mode, the EGR valve is instructed to close to a position of 20% open.

In the following example, the rate of change of the EGR valve is assumed to be 200%/s and thus the time delay (tDly) can be determined to be 0.2 s for the EGR valve to move from the current position, e.g., 60% open, to the desired position, e.g., 20% open. It will be appreciated that the time instances 502 shown in table 500 of FIG. 5 are simplified version and, during real-life implementation, the calculation would be updated more frequently, e.g., every 10 ms.

In this example, a P3 value of 370 kPa is required in order to achieve the target boost pressure that corresponds to the 20% valve position. It will be appreciated that when the calculated P3 limit is above the target boost level, it will have no impact on the operation of the turbocharger as it is a limit and not a target.

At time 0, the maximum rise rate of exhaust manifold pressure is 100 kPa/s, as shown in FIG. 5, and the permitted exhaust manifold pressure limit is determined to be 270 kPa. The turbocharger position is thus limited to control P3 to 270 kPa. The permitted exhaust manifold pressure limit (P3Max) 512 is calculated using the following equation:

$$P3+(dP3\ Max*tDly)=P3\ Max$$

At time 0.1 s, the exhaust manifold pressure is 260 kPa and the predicted EGR valve position is 40%, while its actual position is still 60% due to the time delay of the EGR valve response. The maximum rise rate of exhaust manifold pressure is 400 kPa/s, which can be seen as the corresponding rise rate to the predicted EGR valve position of 40% as shown in FIG. 4. The permitted exhaust manifold pressure limit is now 340 kPa.

At time 0.2 s, the exhaust manifold pressure is 300 kPa and the predicted EGR valve position is 20%, while its actual position is still 60% due to the time delay of the EGR valve response. The maximum rise rate of exhaust manifold pressure is 700 kPa/s and the permitted exhaust manifold pressure limit is now 440 kPa.

At time 0.3 s, the exhaust manifold pressure is shown to be 370 kPa and the predicted EGR valve position is 20%, while its actual position is 40%. The maximum rise rate of exhaust manifold pressure is 700 kPa/s, as shown in the look up table of FIG. 4, and the permitted exhaust manifold pressure limit is now 510 kPa. The boost control system does not need the P3 value to be higher than 370 kPa in order to achieve its boost target. Thus as the permitted P3 limit now exceeds the actual P3 value, the P3 limit function is no longer required to limit the turbocharger to such limits and may be disabled. Alternatively, the P3 limit function may be active continuously and ready to react to any subsequent operational commands.

As exemplified with reference to FIGS. 4 and 5, a rolling buffer of predicted control parameter values, e.g., predicted EGR valve positions, can be used to compensate for the time delay of the control parameter by determining the maximum rise rate of exhaust manifold pressure at the predicted time instance and adjusting the permitted exhaust manifold pressure limit accordingly. Thus, turbocharger operation can be controlled by applying the permitted exhaust manifold pressure limit at each time instance determined using the predicted control parameter values.

One of the technical effects of providing the turbo control method described herein may be to reduce the likelihood of decreased turbocharger performance and turbocharger damage. Consequently, the longevity of the turbocharger assembly is increased, thereby reducing turbocharger maintenance and/or repair over the engine's lifespan. The methods for operating the turbocharger, described herein, can also advantageously reduce the control delays in turbocharger system which may lead to overpressure conditions in the turbocharger.

Figure 6:
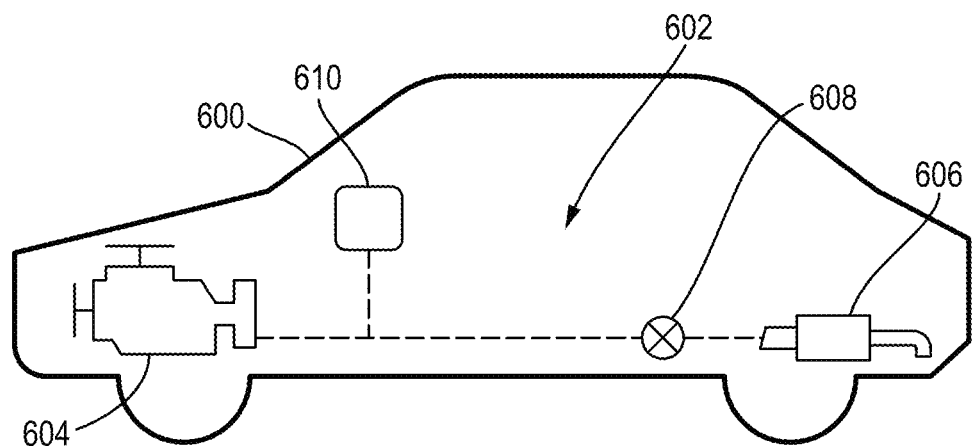
FIG. 6 shows a vehicle comprising a turbocharger control system, in accordance with some examples of the disclosure.

FIG. 6 shows a vehicle 600 comprising a turbocharger control system 602, in accordance with some examples of the disclosure. In the example shown in FIG. 6, the vehicle 600 comprises an engine 604, an exhaust system 606 and actuator 608 configured to control the flow of exhaust gases through the exhaust system 606, e.g., by moving a moveable element of an exhaust gas flow valve. Control unit 610 is in operable communication with engine 604, e.g., by virtue of an engine control module, exhaust system 606, e.g., by virtue of an exhaust control module, and actuator 608, e.g., by virtue of an actuator control module. Control unit 610 is configured to carry out one or more of the above disclosed methods to operate a turbocharger, as described above.

Figure 7:
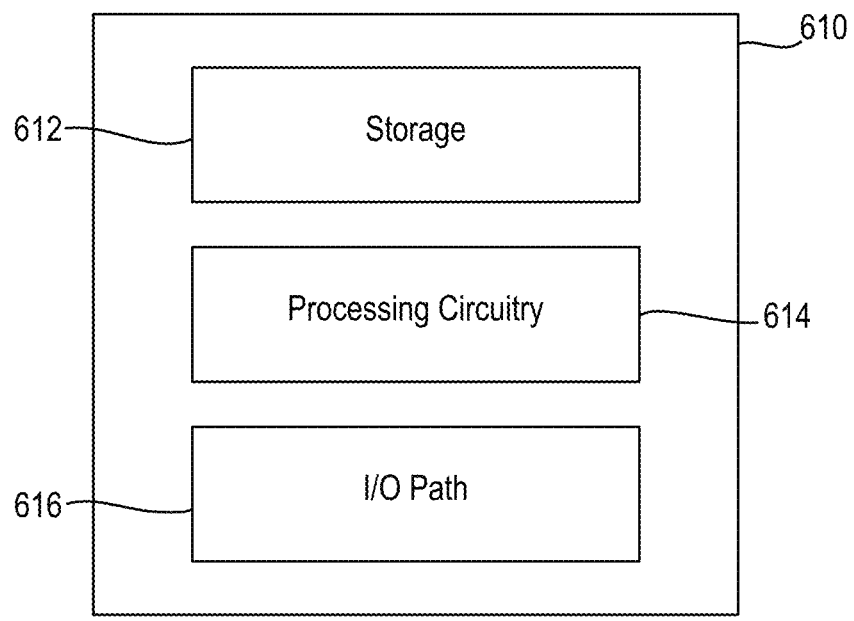
FIG. 7 shows an exemplary block diagram of a control unit.

FIG. 7 shows an exemplary block diagram of control unit 610. Control unit 610 includes storage 612, processing circuitry 614 and I/O path 616. Control unit 610 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors) or multiple different processors (e.g., an Intel Core i7 processor and an Intel Core i9 processor).

Storage 612, and/or storages of other components of actuator control system 602 may be an electronic storage device. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, control unit 610 executes instructions for an application stored in memory (e.g., storage 612). Specifically, control unit 610 may be instructed by an application to perform the methods/functions discussed herein.

The control unit 610 may be configured to transmit and/or receive data via I/O path 616. For instance, I/O path 616 may include a communication port(s) configured to transmit and/or receive data from at least one of an engine control module, an actuator control module and a vehicular system control module, such as an exhaust system control module.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The invention claimed is:

1. A turbocharger control method, the method comprising:
   receiving an operational command to control a level of boost provided by the turbocharger;
   in response to receiving the operational command, instructing an exhaust gas recirculation (EGR) valve to move from a current position to a desired position;
   determining a time taken for the EGR valve to move from the current position to the desired position;
   determining a maximum rise rate of exhaust manifold pressure corresponding to a predicted EGR valve position;
   determining a permitted exhaust manifold pressure limit for the turbocharger based on a current exhaust manifold pressure, the maximum rise rate of exhaust manifold pressure and the time taken; and
   controlling operation of the turbocharger such that the permitted exhaust manifold pressure limit is not exceeded.

2. The method of claim 1, the method comprising enabling the turbocharger control method based on any one or more of: determining that an engine speed is greater than a predetermined engine speed; determining that an output torque of an engine is greater than a predetermined output torque; and/or a combustion mode of an engine.

3. The method of claim 1, wherein the operational command is received upon detecting a request for any one or more of: an increased speed of an engine; an increased amount of torque output by an engine; and/or a change in a combustion mode of an engine.

4. The method of claim 1, wherein the time taken is determined based on a rate of change of position of the EGR valve, the current position and the desired position.

5. The method of claim 1, wherein the predicted EGR valve position is any one of: the current position; the desired position; or any one or more intermediate valve positions between the current position and the desired position.

6. The method of claim 1, wherein the time taken for the EGR valve to move from the current position to the desired position comprises a plurality of time intervals.

7. The method of claim 6, wherein the maximum rise rate of exhaust manifold pressure corresponding to the predicted EGR valve position is determined for each of the plurality of time intervals.

8. The method of claim 1, wherein the operation of the turbocharger is controlled until the level of boost provided by the turbocharger reaches a desired level of boost.

9. The method of claim 1, wherein the turbocharger control method is performed continuously during operation of the turbocharger.

10. A turbocharger control system, the system comprising:
    means for receiving an operational command to control a level of boost provided by the turbocharger;
    means for, in response to receiving the operational command, instructing an exhaust gas recirculation (EGR) valve to move from a current position to a desired position;

means for determining a time taken for the EGR valve to move from the current position to the desired position;

means for determining a maximum rise rate of exhaust manifold pressure corresponding to a predicted EGR valve position;

means for determining a permitted exhaust manifold pressure limit for the turbocharger based on a current exhaust manifold pressure, the maximum rise rate of exhaust manifold pressure and the time taken; and means for controlling operation of the turbocharger such that the permitted exhaust manifold pressure limit is not exceeded.

11. The system of claim 10, further comprising means for enabling the turbocharger control method based on any one or more of: determining that an engine speed is greater than a predetermined engine speed; determining that an output torque of an engine is greater than a predetermined output torque; and/or a combustion mode of an engine.

12. The system of claim 10, wherein the operational command is received upon detecting a request for any one or more of: an increased speed of an engine; an increased amount of torque output by an engine; and/or a change in a combustion mode of an engine.

13. The system of claim 10, wherein the time taken is determined based on a rate of change of position of the EGR valve, the current position and the desired position.

14. The system of claim 10, wherein the predicted EGR valve position is any one of: the current position; the desired position; or any one or more intermediate valve positions between the current position and the desired position.

15. The system of claim 10, wherein the time taken for the EGR valve to move from the current position to the desired position comprises a plurality of time intervals.

16. The system of claim 15, wherein the maximum rise rate of exhaust manifold pressure corresponding to the predicted EGR valve position is determined for each of the plurality of time intervals.

17. The system of claim 10, wherein the operation of the turbocharger is controlled until the level of boost provided by the turbocharger reaches a desired level of boost.

18. The system of claim 10, wherein the operation of the turbocharger is controlled continuously.

19. A vehicle comprising the turbocharger control system of claim 10.

20. A non-transitory computer-readable medium having non-transitory computer-readable instructions encoded thereon for controlling a turbocharger, when executed by control circuitry cause the control circuitry to perform the steps of:

receiving an operational command to control a level of boost provided by the turbocharger;

in response to receiving the operational command, instructing an exhaust gas recirculation (EGR) valve to move from a current position to a desired position;

determining a time taken for the EGR valve to move from the current position to the desired position;

determining a maximum rise rate of exhaust manifold pressure corresponding to a predicted EGR valve position;

determining a permitted exhaust manifold pressure limit for the turbocharger based on a current exhaust manifold pressure, the maximum rise rate of exhaust manifold pressure and the time taken; and controlling operation of the turbocharger such that the permitted exhaust manifold pressure limit is not exceeded.

* * * * *